United States Patent [19]

Grosskopf

[11] 4,132,088
[45] Jan. 2, 1979

[54] REFRIGERATING MACHINE IN FLAT UNIT CONSTRUCTION

[76] Inventor: Peter V. Grosskopf, Am Ruhrstein 25a, 4300 Essen, Fed. Rep. of Germany

[21] Appl. No.: 754,226

[22] Filed: Dec. 27, 1976

[30] Foreign Application Priority Data

Dec. 27, 1975 [DE] Fed. Rep. of Germany ....... 2558821

[51] Int. Cl.² .................... F25D 19/00; B60H 3/04; F25D 23/12
[52] U.S. Cl. .................................... 62/298; 62/239; 62/263
[58] Field of Search ................ 62/298, 263, 239, 414, 62/419; 98/10

[56] References Cited

U.S. PATENT DOCUMENTS

| 2,214,467 | 9/1940 | Lambert et al. | 62/298 |
| 2,265,272 | 12/1941 | Ditzler | 62/298 |
| 3,313,122 | 4/1967 | Laing | 62/263 |
| 3,404,539 | 10/1968 | Laing | 62/263 |
| 3,871,188 | 3/1975 | Vold et al. | 62/298 |
| 3,882,690 | 5/1975 | Duell et al. | 62/298 |

Primary Examiner—Lloyd L. King
Attorney, Agent, or Firm—Fitch, Even, Tabin & Luedeka

[57] ABSTRACT

A refrigerating unit for a truck or freight container is mounted exteriorly of the wall of the vehicle body or container to be cooled with communication through the wall to the interior, has a flat and wide construction relative to the body or container, and includes a cross-current blower extending substantially the full width of the refrigerating unit and discharging cold air under the top of the interior to return at a lower level to the refrigerating unit.

5 Claims, 3 Drawing Figures

REFRIGERATING MACHINE IN FLAT UNIT CONSTRUCTION

The present invention relates to a refrigerating machine in flat unit construction serving on a truck or freight container. Refrigerating machines in flat unit (block) construction are known which are adapted to be attached, for example, to the bodies of refrigerating trucks or vans and which include a pipe section through which cooling air is aspirated and then exhausted, said pipe section passing through an opening in the front wall of the truck body.

However, it is of disadvantage in these conventional refrigerating machines that they do not provide for the circulation of clean cold air, that the just-exhausted cold air is re-aspirated in part, and that the body, particularly when loaded with cargo, is not completely flushed through by cold air. Therefore, regions of lesser or even insufficient cooling efficiency are formed within the truck body.

Another drawback of the conventional refrigerating machines in flat unit construction resides in the fact that these machines are expensive to construct and can be mounted, and especially maintained, with difficulty only.

Accordingly, it is an object of the present invention to provide a refrigerating machine in unit construction which no longer suffers from the above-mentioned drawbacks and from the disadvantages of the prior art and which machine particularly provides for perfect supply of cold air to the container to be refrigerated, even in the loaded condition of such container. Furthermore, inspection and repair of the refrigerating machine should be possible to be performed particularly also from the side of the container without requiring the refrigerating machine to be removed with the aid of hoist gears, and the structure of the refrigerating machine should be simple and of flat configuration, and it should be possible for the first time to generate a forced air flow within the container to be cooled.

In accordance with the present invention, this object is solved in that said machine is of great width relative to the (width of the) vehicle body, and said blower or fan 2 comprises a cross-current blower positioned above said evaporator 1, said blower extending across the full width or almost the full width of said refrigerating machine and discharging the cold air across its full width under the roof 10 of said container into the latter.

Advantageously, cold air is aspirated from the vicinity of the pallets which are required to be positioned with a given spacing from the bottom of the body in order that the forks of forklifts may be inserted into such space, and the cold air is exhausted or discharged into the space between the roof of the container and the upper surface of the pallet load, which space is necessary in order to allow the pallets to be lifted. This mode of exhausting provides for flow of the cold air across the entire load, with the cold air descending into the region of the pallets in front of the loading gate or laterally of the cargo, so as to flow back to the refrigerating machine underneath the pallet plates. Similarly, the cold air may be aspirated through a ventilated bottom surface.

Furthermore, it is required for generating this type of air circulation that either the cargo is placed with a small spacing from the front face of the body of the truck to which the refrigerating machine is mounted or that this wall is formed as an air-conducting double wall. In such case, the setting of the spacing may be effected most easily by using spacer elements.

Further advantageous embodiments of the subject matter of invention are apparent from the accompanying claims.

Below, an exemplary embodiment of the invention is explained in greater detail by referring to the enclosed drawings, wherein.

Figure 2:
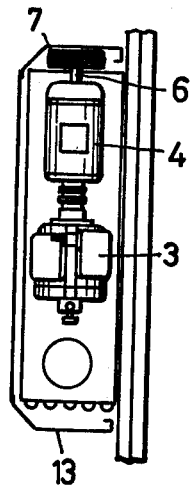
FIG. 2 is a vertical sectional view of the refrigerating machine according to FIG. 1 in the region above the compressor and the drive motor.
Figure 1:
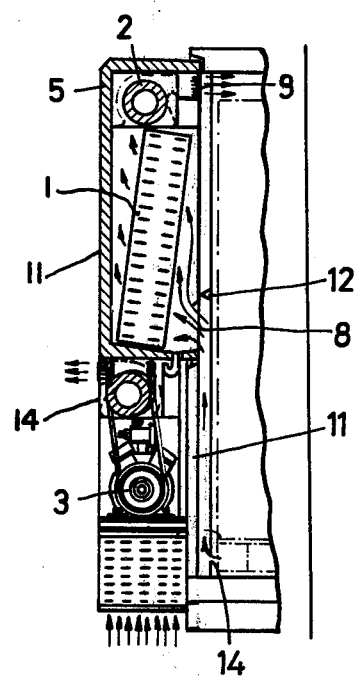
FIG. 1 is a horizontal sectional view of a refrigerating machine according to the present invention as mounted to the front face of the body of a truck.

The refrigerating machine according to the invention comprises an evaporator 1 and a cross-current blower 2 mounted within an insulated casing 5 positioned above a compressor 3 including an electric motor 4 and another cross-current blower 14 or fan for ventilating the warm section. The drive shaft 6 of the blower 2 extends laterally outwards from the casing 5 in sealed fashion, and the stub shaft has mounted thereon V-belt pulleys 7 driven by V-belts at the side of the casing 5. Such drive may be effected either directly by the common shaft of compressor and electric motor, or a V-belt attachment may serve to drive the cross-current blower for ventilation of the warm section, while another set of V-belts may extend from this cross-current blower to the cross-current blower or fan 2 for circulation of the cold air. All of these components are mounted within a common frame and enclosed in a cover housing 13.

The refrigerating machine is mounted to a container body, such as a vehicle body or a freight container, preferably to the front wall of such container. The front wall of the container is provided with an opening to which the insulating casing 5, being open at one end, is secured with the interposition of peripheral seal means. In particular, attachment is made preferably in the upper portion or at the upper edge of the refrigerating machine through articulated clamping screws or bolts, such that the refrigerating machine may be swung down manually adjacent the condenser so as to allow inspection and repairs to be carried out even from its rear side opposing the container.

The evaporator 1 is installed with inclination and inclined towards the rear side of the machine to such degree as to extend in part closely adjacent the front wall 11 of the container. This structure renders possible a particularly flat configuration of the refrigerating machine such that this machine occupies only a minimum amount of the payload volume of the automotive vehicle.

In the region of the insulating casing 5, either this casing is provided with a cover plate at the side of the container, or the front wall of the container includes such a cover portion which need have a thickness of some millimeters only since no insulation is required in this place.

The cover plate or the cover portion spaces out in the upper portion below the roof 10 of the container an inlet opening 8 or intake port for cold air extending over a part or over a major part of the width of the container, and an inlet port or suction opening for the cold air to be aspirated in the lower portion adjacent the insulating casing 5. These openings which may be considered also as slots, are designated by reference numeral 8 at the inlet side and by numeral 9 at the outlet side. As best seem in FIG. 3, the discharge outlet slot 9 and the air inlet opening 8 preferably extend substantially the full width of the casing 5.

The front wall of the container may be constructed as a double wall in the lower part thereof, whereby the bottom in the vicinity of the pallets is also provided with a wide inlet opening 14 for a cold air flow into the double wall; alternatively, the air circulation path for the aspirated cold air is formed by the passageway between the cargo and the lower portion of the front wall 11 of the container. Spacer elements 12 are used to prevent the cargo from being pushed too close to the front wall of the container, while these spacer elements 12, on the other hand, serve to prevent a flow connection between the cold air inlet and outlet in the upper portion of the front wall of the container (i.e. in the portion being open towards the insulating casing 5). However, as is evident to the expert, in order to obtain such air circulation in the upper region it is also possible to provide the front wall 11 of the container or the internal cover of the insulating casing 5 with a corresponding configuration.

Figure 3:
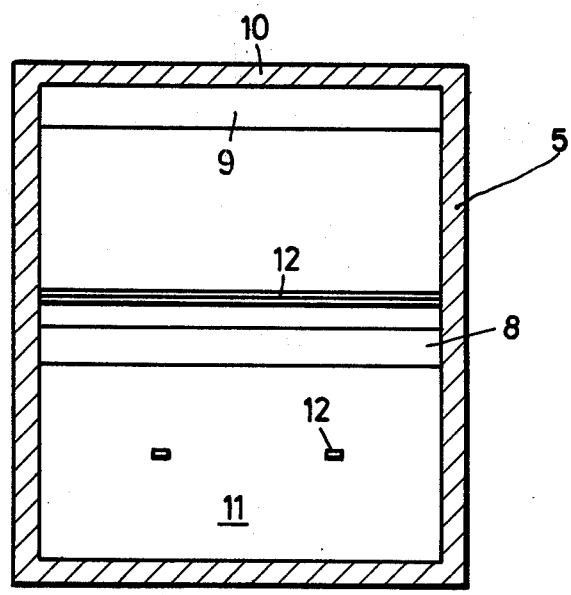
FIG. 3 is a view of the container front wall, as seen from the interior of the container.

In this embodiment, the cross-current blower or fan 2 exhausts the cold air through outlet 9, as best seen in FIG. 3, across a major part of the width of the container above the cargo, and such cold air is reaspirated at the bottom in the pallet region, such that an ideal circulation of air within the container is achieved. This construction for the first time allows to provide in refrigerating trucks or vans and the like a forced air circulation with the advantages resulting therefrom, when a refrigerating block unit is employed.

What is claimed is:

1. A refrigerating machine for securing to the exposed exterior vertical wall of an enclosed insulated container, said refrigerating machine comprising an outer box-like frame casing for securing to the vertical wall of the insulated container, an elongated transversely extending cross-current blower means positioned in the upper end of said frame casing for discharging cold air, a discharge outlet slot in said casing extending substantially the full width of said casing and across said cross-current blower means for discharging cold air into the upper air inlet of said insulated container, an evaporator positioned in said frame casing below said cross-current blower means, an air inlet opening located substantially centrally of the vertical height of said frame casing and spaced downwardly a substantial distance from said discharge outlet slot and extending substantially across the full width of said casing to deliver air to said lower portion of said evaporator, a compressor disposed in said casing below said evaporator for the refrigerant being mounted to said casing, a cross-current blower means for ventilating said compressor and extending transversely across the lower portion of said frame casing and being spaced vertically relative to said compressor and a motor means for driving said compressor also being mounted in said casing.

2. A refrigerating machine in accordance with claim 1 in which said motor means is provided with a shaft extending through said insulated frame casing, and in which a belt means extends along the exterior of said insulated casing and is driven by said shaft of said motor means to drive said cross-current blower means positioned in said upper end of said frame casing.

3. A refrigerating machine in accordance with claim 1 in which said air inlet opening further includes the double wall opening in said housing extending downwardly past said compressor so as to admit air to flow from the lower portion of the insulated container to said evaporator.

4. A refrigerating machine in accordance with claim 1 in which said evaporator is inclined to the vertical.

5. A refrigerating machine in accordance with claim 1 in which the axis of said compressor extends parallel to the respective axes of each cross-current blower means.

* * * * *

UNITED STATES PATENT AND TRADEMARK OFFICE
CERTIFICATE OF CORRECTION

PATENT NO. : 4,132,088
DATED : January 2, 1979
INVENTOR(S) : Peter V. Grosskopf

It is certified that error appears in the above-identified patent and that said Letters Patent are hereby corrected as shown below:

Column 2, line 62, "spaces" should read --spares--.

Signed and Sealed this

Fifteenth Day of May 1979

[SEAL]

Attest:

RUTH C. MASON
Attesting Officer

DONALD W. BANNER
Commissioner of Patents and Trademarks